US011728838B2

(12) United States Patent
Lee et al.

(10) Patent No.: US 11,728,838 B2
(45) Date of Patent: Aug. 15, 2023

(54) ISOLATING DOWN-CONVERSION MIXER FOR A RADIO FREQUENCY (RF) TRANSCEIVER

(71) Applicants: Jang Joon Lee, San Diego, CA (US); Kyle David Holland, San Diego, CA (US); Prakash Thoppay Egambaram, San Diego, CA (US); Aleksandar Miodrag Tasic, San Diego, CA (US); QUALCOMM Incorporated, San Diego, CA (US)

(72) Inventors: Jang Joon Lee, San Diego, CA (US); Kyle David Holland, San Diego, CA (US); Prakash Thoppay Egambaram, San Diego, CA (US); Aleksandar Miodrag Tasic, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/448,309

(22) Filed: Sep. 21, 2021

(65) Prior Publication Data

US 2023/0089569 A1 Mar. 23, 2023

(51) Int. Cl.
*H04B 1/18* (2006.01)
(52) U.S. Cl.
CPC ...................................... *H04B 1/18* (2013.01)
(58) Field of Classification Search
CPC ........ H04B 1/18; H04B 1/0057; H04B 1/006; H04B 1/10; H04B 1/40; H04B 7/0817
See application file for complete search history.

(56) References Cited

U.S. PATENT DOCUMENTS

2004/0100326 A1* 5/2004 Cobley ................. H03F 1/0261
330/279
2006/0014574 A1* 1/2006 Linn .................... H04W 52/028
455/574

(Continued)

FOREIGN PATENT DOCUMENTS

WO    WO-2018151409 A1 *   8/2018    ............... H03D 7/16

OTHER PUBLICATIONS

International Search Report and Written Opinion—PCT/US2022/039976—ISA/EPO—dated Dec. 2, 2022.

*Primary Examiner* — Sophia Vlahos
(74) *Attorney, Agent, or Firm* — Norton Rose Fulbright LLP

(57) ABSTRACT

Carrier aggregation (CA) may cause interference between operation on two or more carriers within a user equipment (UE). This interference can degrade signal quality on one or more of the carriers involved in the carrier aggregation, which may be referred to as "desensing" one or more carriers. One or more isolating buffers may be coupled at a down-conversion mixer at a point where the down-conversion mixer receives a signal from a transmission line for isolating the transmission line from other transmission lines. The isolating buffer may reduce the effect of interference between multiple transmission lines carrying different carriers during carrier aggregation (CA) operation. The isolating buffers may be used in an RF transceiver supporting both 5G sub-7 GHz and 5G mmWave wireless networks and carrier aggregation across sub-7 GHz and mmWave bands.

28 Claims, 11 Drawing Sheets

(56) References Cited

U.S. PATENT DOCUMENTS

| | | | |
|---|---|---|---|
| 2008/0057899 A1* | 3/2008 | Montemayor | H04B 17/21 |
| | | | 455/255 |
| 2013/0265892 A1 | 10/2013 | Fernando | |
| 2014/0113578 A1 | 4/2014 | Xu et al. | |
| 2014/0134959 A1* | 5/2014 | Tasic | H04B 1/18 |
| | | | 455/73 |
| 2015/0237583 A1 | 8/2015 | Hassan et al. | |
| 2015/0311895 A1* | 10/2015 | Ali | H03F 1/3205 |
| | | | 327/319 |
| 2018/0145695 A1* | 5/2018 | Lahiri | H03L 7/1976 |
| 2019/0172635 A1* | 6/2019 | Ku | H01F 30/12 |
| 2020/0076032 A1 | 3/2020 | Gavryliuk et al. | |

\* cited by examiner

US 11,728,838 B2

ISOLATING DOWN-CONVERSION MIXER FOR A RADIO FREQUENCY (RF) TRANSCEIVER

FIELD OF THE DISCLOSURE

Aspects of the present disclosure relate generally to wireless communication systems, and more particularly, to radio frequency (RF) processing circuitry for wireless communication systems. Some features may enable and provide improved communications, including RF transceivers with improved isolation between signal paths.

BACKGROUND

Wireless communication networks are widely deployed to provide various communication services such as voice, video, packet data, messaging, broadcast, and the like. These wireless networks may be multiple-access networks capable of supporting multiple users by sharing the available network resources. Such networks may include multiple access networks that support communications for multiple users by sharing the available network resources and employing different access techniques for using and sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed within communities. The congestion may be further increased when UEs are configured to operate on multiple frequency bands simultaneously. Each frequency band may be centered at a different carrier frequency (or, simply, a "carrier"), and multiple carriers may be used simultaneously to transmit the same data flow in an operation referred to as carrier aggregation (CA). Carrier aggregation may create further sources of interference both within the communication network, where signals may interfere in transit to and from a base station, and within the devices, where signals may interfere within the semiconductor devices operating within the UE or BS devices.

Shortcomings mentioned here are only representative and are included to highlight problems that the inventors have identified with respect to existing devices and sought to improve upon. Aspects of devices described below may address some or all of the shortcomings as well as others known in the art. Aspects of the improved devices described below may present other benefits than, and be used in other applications than, those described above.

BRIEF SUMMARY OF SOME EXAMPLES

According to aspects of devices described in the examples described herein, an isolating down-conversion mixer, such as a buffer stage with a shunt capacitor for filtering, may provide increased isolation between one transmission path and other transmission paths in a receiver, particularly when the transmission paths are cross-routed through a routing matrix or other switching device. As a result, the isolation is improved between transmission paths. The buffer and shunt capacitor may be turned on for carrier aggregation (CA) operation or be turned off for single-carrier operation.

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, an apparatus includes a plurality of amplifiers configured to amplify a respective plurality of input signals, wherein the respective plurality of input signals correspond to input signals in different frequency bands. The apparatus may further include a plurality of down-converters configured to process an output of at least one of the plurality of amplifiers. In some aspects, the plurality of down-converters are configured to provide carrier aggregation (CA) processing when the input RF signal comprises 5G sub-7 GHz RF signals, configured to provide 5G mmWave processing when the input RF signal comprises 5G mmWave RF signals, and/or configured to provide carrier aggregation across wide spectrums such as between 5G mmWave and 5G sub-7 GHz signals. The apparatus may further include a plurality of transmission lines coupling the plurality of amplifiers to the plurality of down-converters, wherein each down-converter of the plurality of down-converters includes a first mixer and a buffer coupled between the first mixer and one of the plurality of transmission lines.

In some aspects, the buffer is configured to be enabled or disabled; the controller is configured to apply a buffer configuration to the plurality of down-converters, the buffer configuration specifying for each of the down-converters whether to enable or disable the buffer of the down-converter; the controller is configured to determine the buffer configuration based on determining an active carrier aggregation (CA) configuration includes a mmWave band; the plurality of down-converters each comprise a second mixer coupled to the one of the plurality of transmission lines and coupled to the first mixer, a third mixer coupled to the buffer, and/or a fourth mixer coupled to the one of the plurality of transmission lines and to the third mixer; the controller is configured to configure the second mixer and the fourth mixer of one of the plurality of down-converters as dummy mixers when the buffer of the one of the plurality of down-converters is enabled; the controller is configured to configure the first mixer and the third mixer of one of the plurality of down-converters as dummy mixers when the corresponding buffer of the one of the plurality of down-converters is disabled; the controller is configured to determine a spur value on one of the plurality of transmission lines and/or enable the buffer of one of the plurality of down-converters coupled to the one of the plurality of transmission lines in response to the spur value of the one of the plurality of transmission lines being above a threshold value; the buffer comprises a shunt capacitor configured to couple the one of the plurality of transmission lines to a negative power supply in response to the controller enabling the buffer; the buffer comprises a cascode transistor; the buffer comprises a complimentary metal-oxide-semiconductor (CMOS) amplifier; and/or the buffer comprises at least one of a common-source amplifier, a common-gate amplifier, or a source-follower amplifier.

In some examples for simultaneously processing mmWave-IF signals and high-band (HB) signals, the apparatus may be configured with the plurality of amplifiers comprising a first amplifier configured to amplify an input signal comprising a mmWave-IF signal and a second amplifier configured to amplify a high-band (HB) signal; and the plurality of down-converters comprises a first down-converter coupled to the first amplifier and coupled to the second amplifier, and/or a second down-converter coupled to the first amplifier and coupled to the second amplifier.

In some examples for simultaneously processing a mmWave-IF signal with a high-band (HB) signal, the apparatus may be configured with the buffer of the first down-converter coupled to the transmission line of the plurality of transmission lines corresponding to the high-band (HB) signal; the first down-converter further comprising a second mixer coupled to a transmission line of the plurality of transmission lines corresponding to the mmWave-IF signal; the buffer of the second down-converter being coupled to the transmission line of the plurality of transmission lines corresponding to the high-band (HB) signal; and/or the second down-converter further comprising a second mixer coupled to a transmission line of the plurality of transmission lines corresponding to the mmWave-IF signal.

In some examples for simultaneously processing a License Assisted Access/New Radio Unlicensed (LAA/NRU) signal with a low-band (LB) signal, the apparatus may be configured with the plurality of amplifiers comprising a first amplifier configured to amplify an input signal comprising a LAA/NRU signal and a second amplifier configured to amplify a low-band (LB) signal; the plurality of down-converters comprising a first down-converter coupled to the first amplifier and coupled to the second amplifier and/or a second down-converter coupled to the first amplifier and coupled to the second amplifier; with the buffer of the first down-converter being coupled to the transmission line of the plurality of transmission lines corresponding to the low-band (LB) signal, the first down-converter further comprising a second mixer coupled to a transmission line of the plurality of transmission lines corresponding to the LAA/NRU signal, the buffer of the second down-converter being coupled to the transmission line of the plurality of transmission lines corresponding to the high-band (HB) signal, and/or the second down-converter further comprising a second mixer coupled to a transmission line of the plurality of transmission lines corresponding to the mmWave-IF signal.

In an additional aspect of the disclosure, an apparatus is disclosed that includes at least one processor, and a memory coupled to the at least one processor. The at least one processor is configured to perform any of the methods or techniques described herein. For example, the at least one processor may be configured to perform steps including controlling a mixer configuration specifying enabling or disabling of one or more isolating buffers to improve isolation and reduce desense of other transmission paths in a receiver.

In an additional aspect of the disclosure, a non-transitory computer-readable medium stores instructions that, when executed by a processor, cause the processor to perform operations including those described in the method and techniques described herein. For example, the operations may include controlling enabling or disabling of buffers, such as in controlling switches to bypass an isolating buffer, to reduce desensing and/or otherwise control operation of an apparatus including down-conversion mixers and isolating buffers according to aspects of this disclosure.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The foregoing has outlined rather broadly certain features and technical advantages of examples of the present invention in order that the detailed description that follows may be better understood. Additional features and advantages will be described hereinafter that form the subject of the claims of the invention. It should be appreciated by those having ordinary skill in the art that the conception and specific example disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
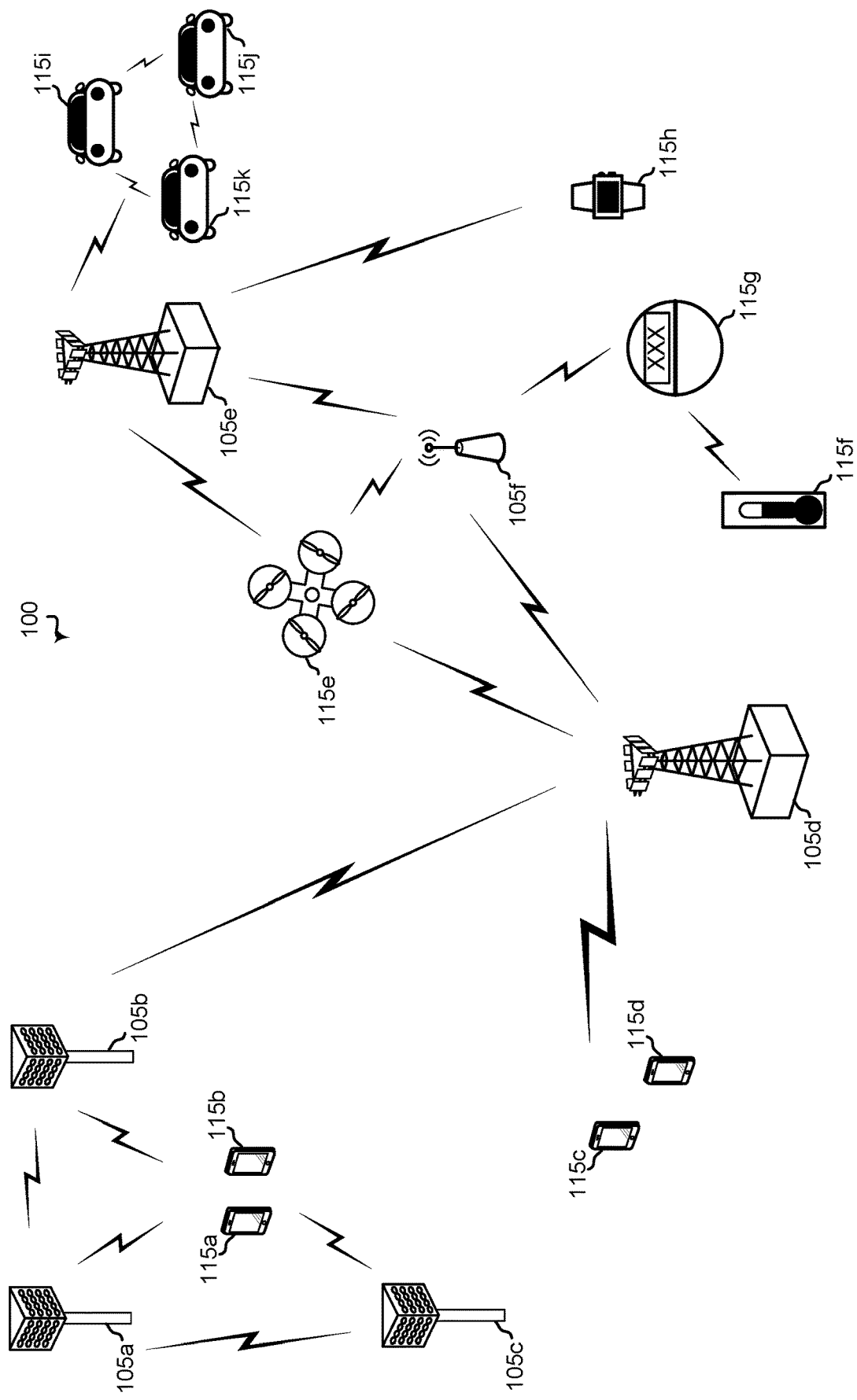
FIG. 1 is a block diagram illustrating details of an example wireless communication system according to one or more aspects.

Carrier aggregation (CA), or any simultaneous operation on multiple frequency bands, may cause interference between operation on two or more carriers within a user equipment (UE) or base station (BS). This interference can degrade signal quality on one or more of the carriers involved in the carrier aggregation, which may be referred to as "desensing" one or more carriers. A solution to improve simultaneous operation on multiple carriers in a UE or BS may include the implementation of one or more isolating buffers coupled at, or directly to, a down-conversion mixer at a side of the transmission line where the down-conversion mixer receives the signal from the transmission line. The isolating buffer may reduce the effect of interference between multiple transmission lines carrying different carriers during carrier aggregation (CA) operation. Although embodiments may be described with respect to the use of an isolating buffer to improve carrier aggregation (CA) operation, aspects of devices described herein may use down-conversion mixers with isolating buffers for operations not involving CA.

In one example operation of a radio frequency (RF) transceiver, local oscillator (LO) harmonics and/or leaked transmission signals (e.g., −8 dBm at receiver input) can generate strong spurs on a transmission line carrying the corresponding signal. During carrier aggregation (CA) operation or other simultaneous operation on multiple frequency bands, the spurs on one transmission line can be coupled to and appear on other transmission lines via routing of the transmission line nearby to another transmission line or crossing over another transmission line due to their long and tangled routings in a receiver. The coupling of the spur to other transmission lines can desense the desired signals in the other transmission lines.

The challenge with supporting operation on multiple carriers, such as in a carrier aggregation (CA) configuration, may be increased when supporting carrier aggregation across multiple radio access technologies, such as when combining operation on 3G, 4G LTE, 5G sub-7 GHz, and/or 5G mmWave wireless networks. Supporting both 5G sub-7 GHz and 5G mmWave wireless networks, and carrier aggregation across sub-7 GHz and mmWave, may be particularly challenging because of the wide range of frequencies (e.g., 0.6-14 GHz) from low-band (LB) sub-7 GHz signals to mmWave-IF signals (e.g., 7.2-13.8 GHz). Similar interference may occur between low-band (LB) and high-band (HB), LB and uplink network assistance (UNA), LB and New Radio Unlicensed (NRU) etc. For example, operation on band B7 in the high-band (HB) on one transmission path and mmWave (which may refer to either mmWave-IF or EHF frequency bands) on a nearby transmission path may cause a spur in the B7 transmission path to be coupled to the mmWave-IF transmission path, which may desense the mmWave-IF signal. As another example, operation on the B5 band in the low-band (LB) on one transmission path and HB, network assistance (NA), NRU, or mmWave-IF on a nearby transmission path may cause a spur in the B5 transmission path to be coupled to the HB, NA, NRU, and/or mmWave-IF transmission path, which may desense one or more of the HB, NA, NRU, and/or mmWave-IF signal. Two such wireless networks could potentially be supported through the use of separate integrated circuits (ICs) for each wireless networks, such that the interference does not occur, or occurs only at a much lower level, between transmission paths for two different wireless network. However, the use of two chips is disadvantageous due at least to size, cost, and power consumption issues within a device incorporating the two chips.

According to aspects of devices described in the embodiments described herein, an isolating down-conversion mixer, such as a buffer stage with a shunt capacitor for filtering, may provide increased isolation between one transmission path and other transmission paths, particularly when the transmission paths are cross-routed through a routing matrix or other switching device. As a result, the isolation is improved between transmission paths in the receiver. The buffer and shunt capacitor may be turned on for carrier aggregation (CA) operation or be turned off for single-carrier operation.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., 99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-7 GHz" band in various documents and articles, but will be referred to herein as "sub-7 GHz". A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-7 GHz" or the like if used herein may broadly represent frequencies that may be less than 7 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail device or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity. Either the base station 105 or the UE 115 or other devices communicating on the wireless network 100 may implement embodiments of receiver circuitry described herein.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100. A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
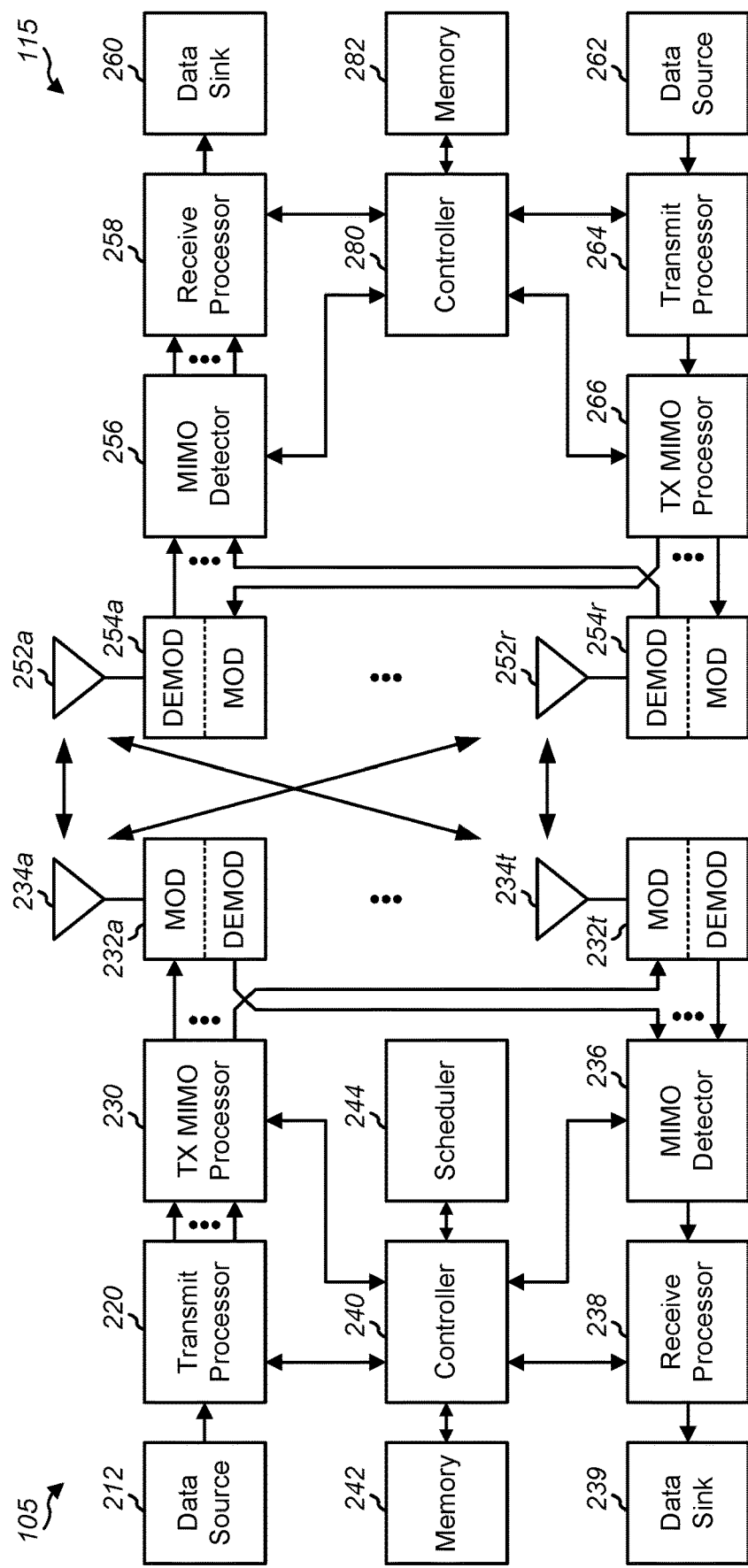
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes within the devices and/or the wireless network. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own back-off window based on the amount of energy detected on a channel or the acknowledge/negative-acknowledge (ACK/NACK) feedback for its own transmitted packets as a proxy for collisions.

mmWave signals or other large bandwidth RF signals conventionally use separate hardware for processing the RF signals separate from smaller bandwidth RF signals, such as 2G, 3G, 4G, or 5G sub-7 GHz RF signals. A receiver may be configured to be capable of processing different RF signals within one integrated circuit (IC) according to aspects of this disclosure. Such processing may be enabled by the use of an isolating buffer to improve isolation of transmission lines carrying different RF signals.

Figure 3:
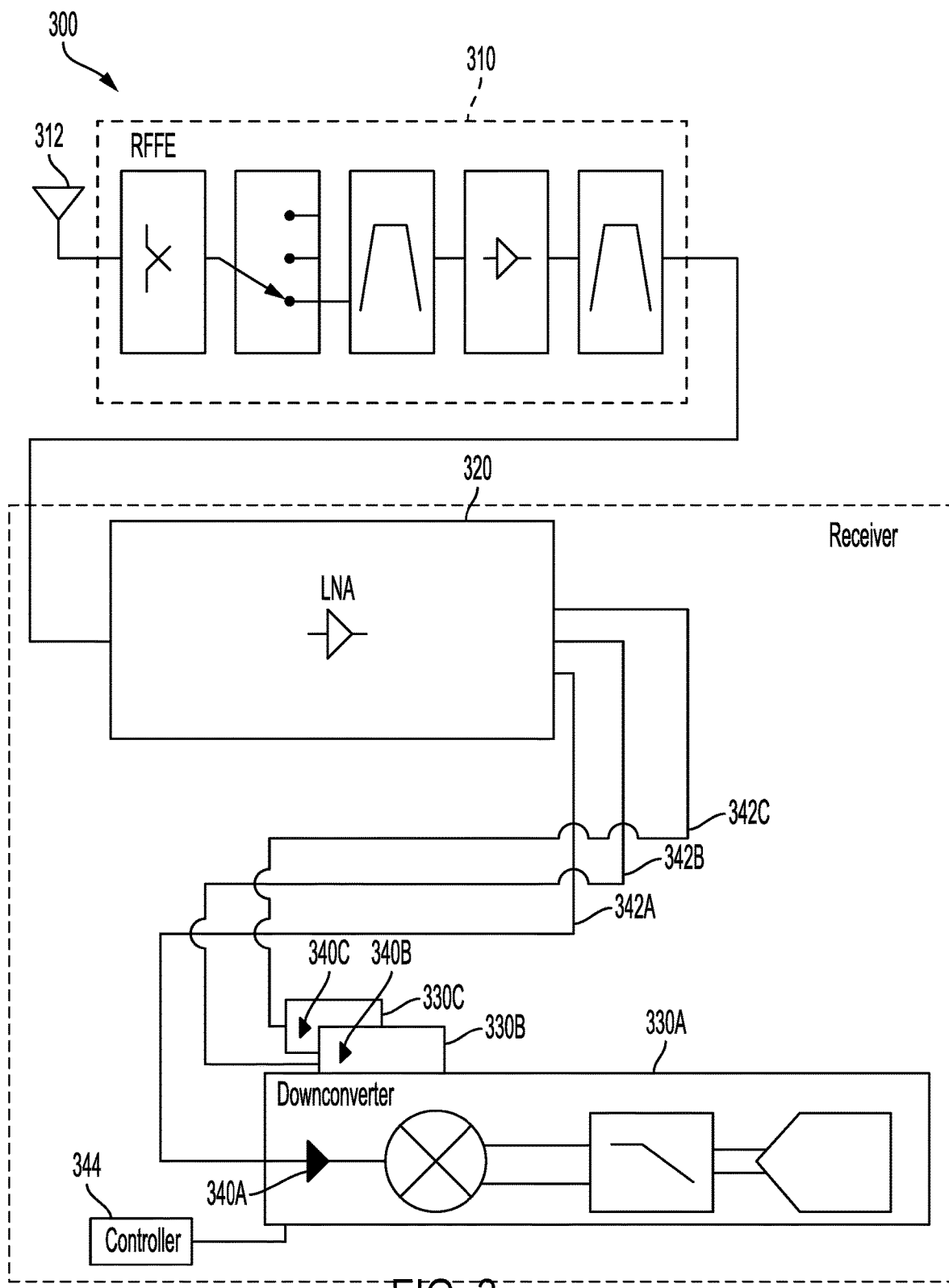
FIG. 3 is a block diagram illustrating an RF transceiver with isolating down-conversion mixers according to one or more aspects.

FIG. 3 is a block diagram illustrating an RF transceiver with isolating down-conversion mixers according to one or more aspects. A circuit 300, such as a radio frequency (RF) transceiver, may include an antenna 312 to receive radio frequency (RF) signals. The antenna 312 is coupled to a RF front-end (RFFE) 310, which may include duplexers, SAW filters, switches, and/or LNAs. The RFFE 310 is coupled to an amplifier 320, which may include one or more low noise amplifiers (LNAs). The amplifier 320 is coupled to one or more down-converters 330A, 330B, and 330C through transmission lines 342A, 342B, and 342C, respectively. Transmission lines 342A-C may be long up to several millimeters and cross-routed. The transmission lines 342A-C may be implemented with on-chip metal conductors of an integrated circuit. Modern wireless RF transceivers supporting high speed and high throughput demands mmWave communication as well as multiple carrier aggregations. A complex RF transceiver such as converged mmWave and sub-7 GHz 5G transceiver cannot avoid long and congested cross-routed transmission lines to support multiple number of receive paths. Each of the down-converters 330A-C may include mixers, baseband filters (BBFs), and/or analog-to-digital converters (ADCs). In some embodiments, the amplifier 320 is shared on an integrated circuit (IC) with one or more of components of the RFFE 310 and/or the down-converters 330A, 330B, and 330C. Although only a single antenna 312 is shown, multiple antennas 312 may be used to provide diversity signals within a single frequency band and/or multiple antennas 312 may be used to receive RF signals in different frequency bands. Likewise, multiple RFFE 310 may be included to process different frequency bands received from the one or more antennas 312. The amplifier 320 may be configured with multiple amplifiers for processing signals from different antennas. Such multiple amplifiers may be separately configured to amplify signals within certain frequency bands and/or multiple amplifiers may be configured to generically amplify signals interchangeable between different frequency bands.

The receiver circuit 300 may be configured to support carrier aggregation (CA), which involves the combination of one or more carrier RF signals to carry a single data stream. Carrier aggregation (CA) improves the flexibility of the wireless devices and improves network utilization by allowing devices to be assigned different numbers of carriers for different periods of time based, at least in part, on historical, instantaneous, and/or predicted bandwidth use by the wireless device. Thus, when a mobile device needs additional bandwidth, additional carriers may be assigned to that wireless device, and then de-assigned and re-assigned to other mobile devices when bandwidth demands change. As carriers are assigned and de-assigned from a mobile device, the receiver circuitry associated with those carriers may be disabled, resulting in a change in the configuration of the circuitry. The changes in circuit configuration may change characteristics of the circuit 300, such as spurs generated on various transmission lines and how the spurs are coupled to other transmission lines. The receiver circuit 300 may respond by changing the enabling and disabling of isolating buffers 340A-C to match a buffer configuration determined based on the CA configuration. Isolating buffers 340A-C may be components with no gain, good linearity, and minimal power consumption. They are designed to have minimal effects on the receiver performance with or without them A controller 344 coupled to the isolating buffers 340A-C may determine a buffer configuration and control the isolating buffers 340A-C based on the determined buffer configuration. Different bands may create different interferences, particularly when the different bands involved in CA operation are from different frequency bands as in inter-band CA or different technologies as in inter-RAT CA. For example, when the receiver circuit 300 is configured to operate simultaneously on sub-7 Ghz 5G and mmWave 5G, whether the operations are coordinated in CA operations or simply simultaneous transmission, the signals from the different frequency bands may interfere with each other within circuitry of the UE or BS. The isolating buffers may be enabled on certain transmission lines for reducing such interference. The controller 344 may be configured to determine the buffer configuration based on determining that an active carrier aggregation (CA) configuration includes a mmWave band. The location of the mmWave band in relation to the sub-7 GHz bands (e.g., multiples higher) may increase the likelihood of the mmWave band being a victim of spurs in the sub-7 GHz bands. For example, a mmWave intermediate frequency (IF) band signal may be near in frequency to a sub-7 GHz RF band signal, such that processing the mmWave IF band signals in the same signal paths as sub-7 GHz RF band signals and/or in nearby signal paths to the sub-7 GHz RF band signals may cause undesirable interactions between the signals. In response to the CA configuration determination, the controller 344 may enable isolating buffers coupled to a HB signal transmission line that is nearby to or crosses over a mmWave transmission line. The controller 344 may alternatively or additionally be configured to determine a spur value on one of the plurality of transmission lines and to enable the buffer of one of the plurality of down-converters coupled to the one of the plurality of transmission lines in response to the spur value of the one of the plurality of transmission lines being above a threshold value. The controller 344 may enable the isolating buffer of the transmission line with the spur above the threshold value in response to the transmission line with the large spur value being nearby, such as adjacent to, another transmission line with an active signal path for a mmWave-IF signal.

In some embodiments, the controller 344 may be replaced by or supplemented by separate logic circuitry coupled to the isolating buffers 340A, 340B, and 340C. For example, each isolating buffer 340A, 340B, and 340C may include circuitry for determining whether to enable/disable, bypass, or otherwise configure the isolating buffer based on one or more criteria. The separate logic circuitry may monitor conditions on one of the transmission lines 342A, 342B, 342C as part of the criteria for configuring the isolating buffers 340A, 340B, and 340C, respectively, allowing the logic circuitry for each isolating buffer to operate autonomously in providing isolation between the downconverters 330A, 330B, 330C and transmission lines 342A, 342B, 342C, respectively, according to some embodiments.

Figure 4A:
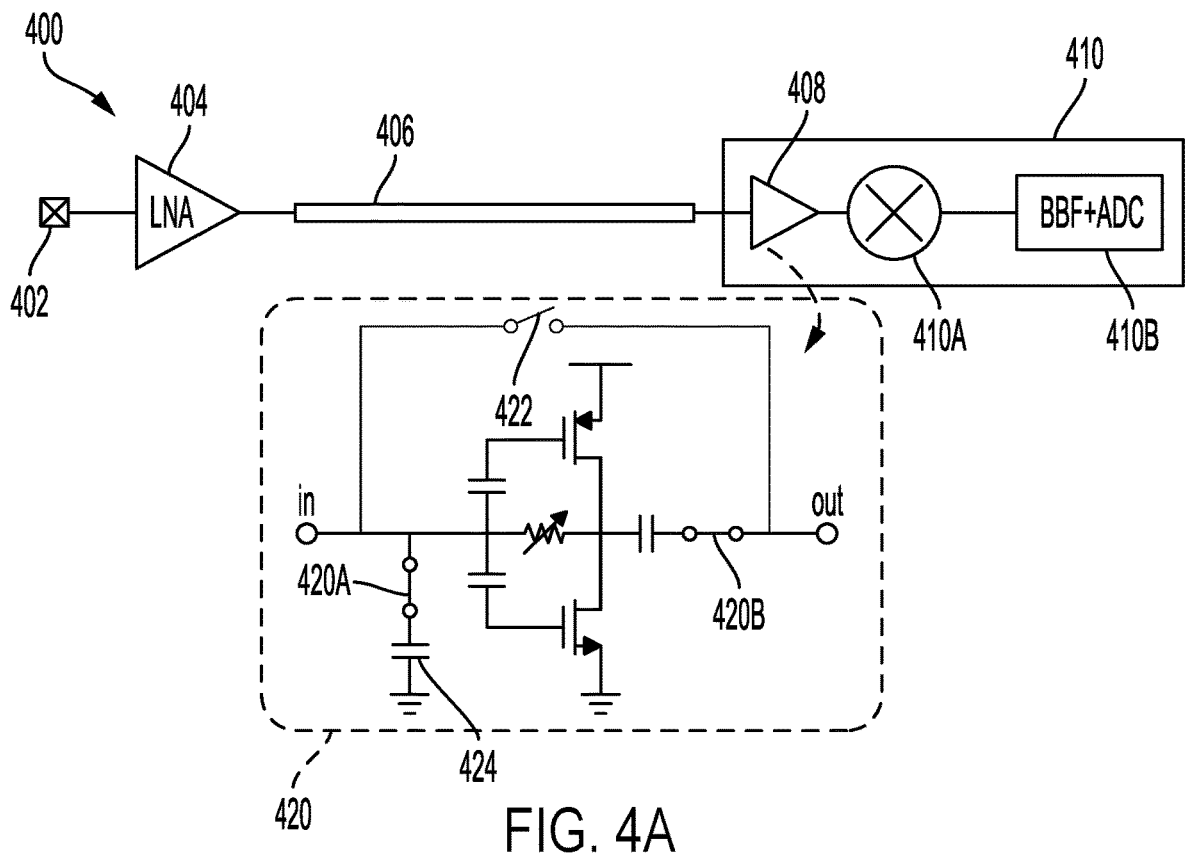
FIG. 4A is a circuit schematic illustrating a configurable buffer with the buffer enabled for isolating a mixer in a downconversion circuit according to one or more aspects.

One example embodiment for an isolating buffer within a receiver such as receiver circuit 300 is described with reference to FIG. 4A and FIG. 4B. FIG. 4A is a circuit schematic illustrating a configurable buffer with the buffer enabled for isolating a mixer in a downconversion circuit according to one or more aspects. Receive path 400 may include a transmission line 406 coupling amplifier 404 with isolating buffer 408, with down-converter 410 coupled immediately after the transmission line 406 through the isolating buffer 408. The operation of the isolating buffer 408 may be improved by directly connecting the isolating buffer 408 to the mixer 410A and to the transmission line 406, which enhances the isolating aspect of the buffer 408. The isolating buffer 408 may include one or more of a complimentary metal-oxide-semiconductor (CMOS) amplifier, a common-source amplifier, a common-gate amplifier, and/or a source-follower amplifier. The down-converter 410 may include a mixer 410A configured for downconversion, such as by having a local oscillator signal input to the mixer 410A that results in downconversion of the RF signal received at input port 402 to a baseband signal. The mixer 410A may be, for example, a passive or active mixer. The output of the mixer 410A may be processed by baseband circuitry 410B, such as a baseband filter (BBF) and/or an analog-to-digital converter (ADC). The output of the down-converter 410 may be input to a baseband processor for processing of the input signal to obtain commands or data from the input signal, such as to decode a physical downlink shared channel (PDSCH) or a physical downlink control channel (PDCCH) from the received signal.

Multiple transmission paths such as path 400 may be included in a RF transceiver to process multiple signals. For example, several paths, such as path 400, may be used in the RF transceiver 300 of FIG. 3 to couple amplifier 320 to down-converters 330A-C. In some embodiments, the transmission line 406 may couple multiple amplifiers, such as amplifier 404, to a down-converter 410. In some embodiments, some amplifiers within amplifier 320 may be coupled to one of the down-converters 330A-C without an isolating buffer, such as buffer 408.

One example circuit 420 for the isolating buffer 408 may include switches 420A, 420B, and 422 that allow the buffer 408 to be enabled or disabled through appropriate control signals. For example, a controller may generate separate control signals for the switches 420A, 420B, and 422 or the controller may generate a signal control signal for switches 420A and 420B with a "bar" signal or inverted version of that control signal coupled to switch 422. The switches 420A and 420B may be controlled to be closed when switch 422 is open to enable the buffer 408. The switches 420A and 420B may be controlled to be open when switch 422 is closed to disable and bypass the buffer 408. A shunting capacitor 424 coupled to the transmission line through switch 420A may enhance isolation of the input signal on transmission line 406 from signals on neighboring transmission lines by acting as a filter. In some embodiments, the shunting capacitor 424 may be separately enabled and disabled through independent control of the switch 420A.

The shunt capacitor can be controlled independently of the enabling/disabling of the isolating buffer. The shunting capacitor 424 may also form a low-pass filter with the impedance of the transmission line 406, and the low-pass filter may suppress higher frequency jammer/noise signals entering the isolating mixer. The shunting capacitor 424 may include switched capacitors with multiple control signals, and these control signals may be configured based on operating frequency bands, carrier aggregation (CA), and/or other criteria. The shunting capacitor can be turned on, turned off, or removed based on desired isolation levels.

As shown in the example of FIG. 4A, the buffer 408 is enabled. The buffer 408 may be disabled and a bypass path activated (e.g., closed) to couple the transmission line 406 to the mixer 410A without the input signal passing through buffer circuitry. The switches 420A, 420B, and 422 may be configured for bypass as shown in the example of FIG. 4B. FIG. 4B is a circuit schematic illustrating a configurable buffer with the buffer disabled for isolating a mixer in a downconversion circuit according to one or more aspects. The switch 422 is closed and the switches 420A and 420B are open, such that the input signal passes through bypass path 426 to the mixer 410A. The enabling and disabling of the buffer 408 may be performed by a controller coupled to one or more buffers, such as buffer 408, and configured to determine which buffers to enable and which buffers to disable. In some embodiments, a bypass path could be provided around the buffer 408 as a means of removing the buffer 408 from the signal path to effectively disable the buffer 408. Such a bypass path may be implemented with buffer implementations different from that shown in circuit 420.

Figure 5A:
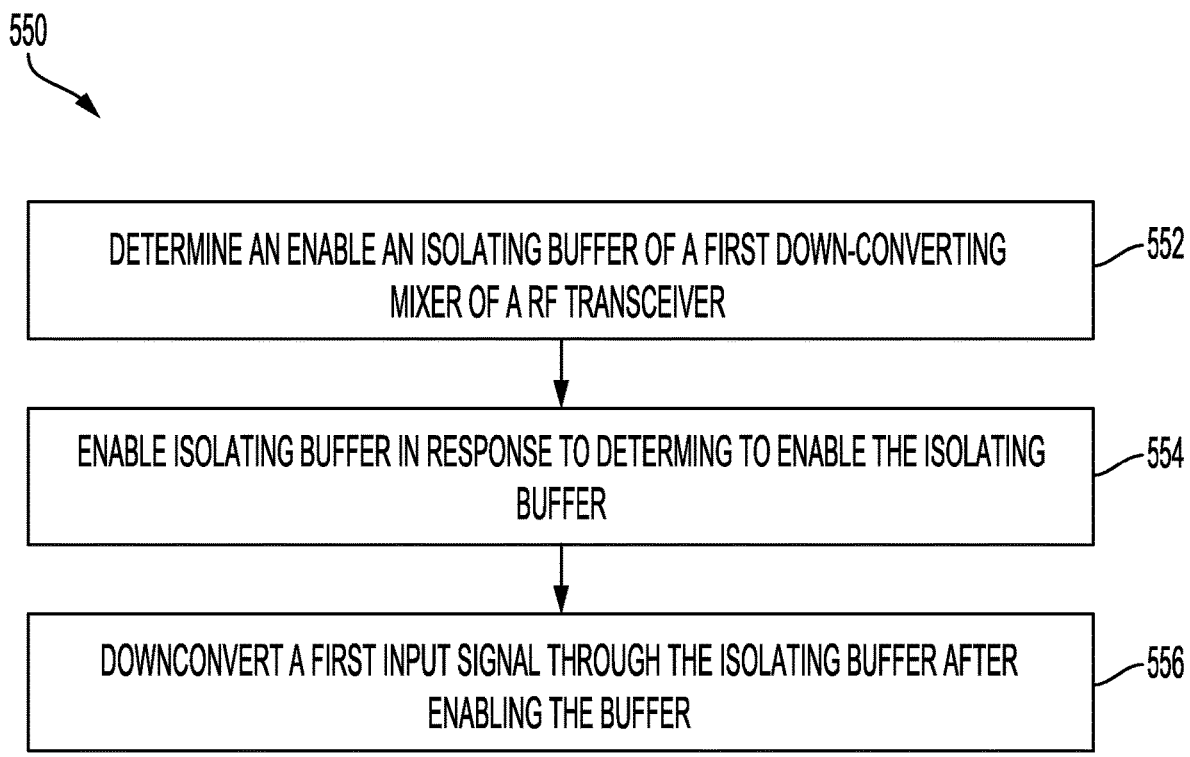
FIG. 5A is a flow chart illustrating a method for operating a transceiver with a configurable buffer according to one or more aspects.

An RF transceiver may control isolating buffers, such as buffer 408, as described with reference to FIG. 5A. FIG. 5A is a flow chart illustrating a method for operating a transceiver with a configurable buffer according to one or more aspects. A method 550 may include, at block 552, determining to enable an isolating buffer of a first down-converting mixer of a radio frequency (RF) transceiver. The determination may be based on, for example, RFFE configuration, LNA configuration, base station (BS, eNB) configuration, cell resource configuration, mobile device grant assignments, and/or other criteria. At block 554, the method may include enabling the isolating buffer of the first down-converting mixer of the RF transceiver in response to the determining to enable the isolating buffer. At block 556, the method may include down-converting a first input signal received from a first transmission line with the first down-converting mixer through the isolating buffer after enabling the isolating buffer. A controller or other logic circuitry may perform the determination of block 552, the controlling of the buffer of block 554, and control the down-conversion of block 556, although the actual down-conversion may be performed by a down-converter including a mixer. Additional details and aspects for operating a transceiver with configurable isolation are described with reference to FIG. 5B.

Figure 5B:
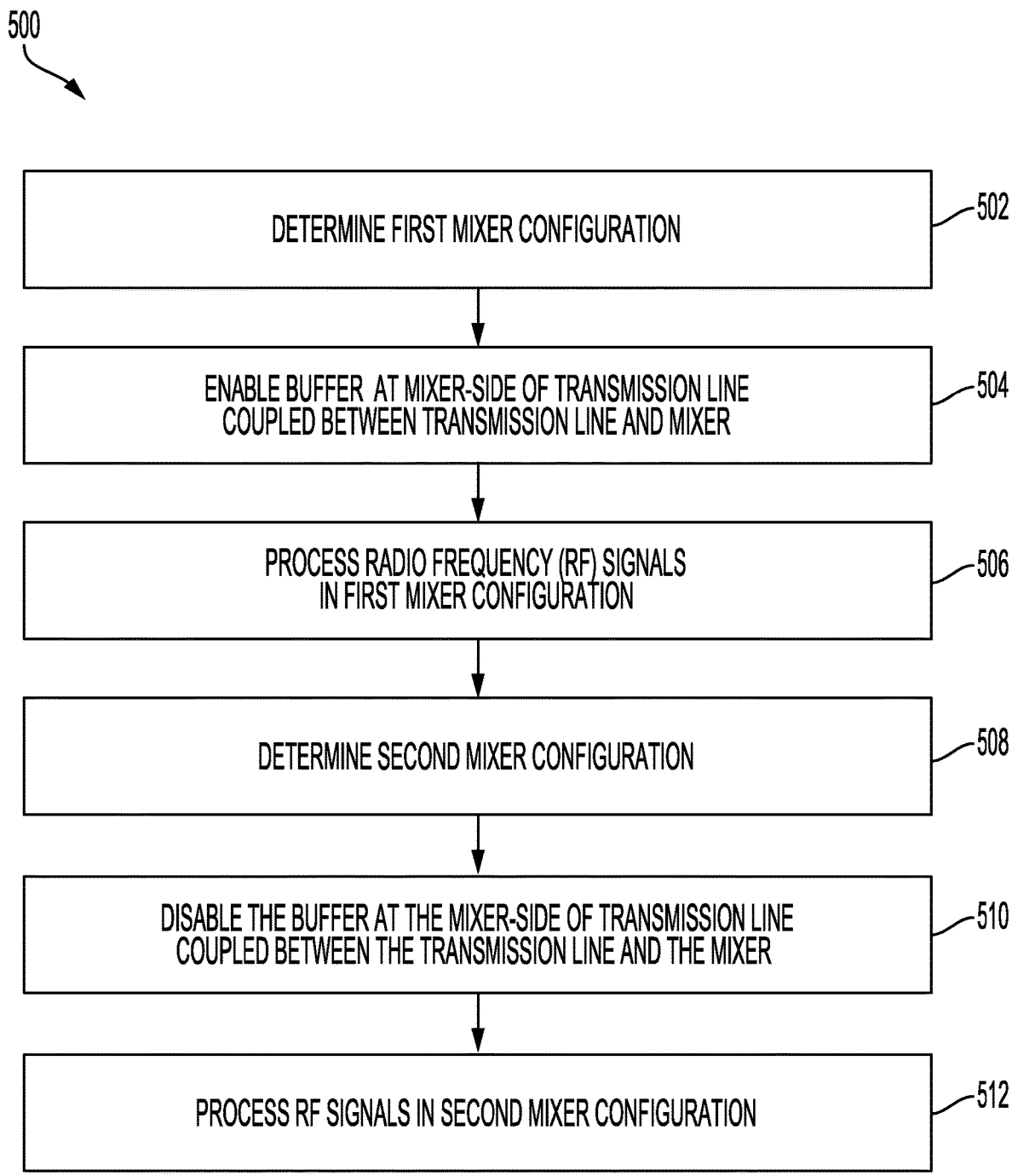
FIG. 5B is a flow chart illustrating a method for operating a transceiver with a configurable buffer according to one or more aspects.

The enabling and disabling of the buffer may be based on a mixer configuration as shown in FIG. 5B. FIG. 5B is a flow chart illustrating a method for operating a transceiver with a configurable buffer according to one or more aspects. A method 500 includes, at block 502, determining a first mixer configuration for the RF transceiver. The mixer configuration may include enabling a buffer based on one or more criteria evaluated when determining the first mixer configuration at block 502. At block 504, the isolating buffer between the transmission line and the mixer at the mixer-side of the transmission line may be enabled. At block 506, radio frequency (RF) signals may be processed using the first mixer configuration of block 504. At block 508, a second mixer configuration may be determined based on or more criteria changing from the determination at block 502. The second mixer configuration of block 508 may be applied at block 510 to disable the isolating buffer coupled between the transmission line and the mixer at the mixer-side of the transmission line. At block 512, RF signals are processed using the second mixer configuration. The first and second mixer configuration may include an enable/disable specification for multiple isolating buffers when multiple isolating buffers are present in the RF transceiver. In one example embodiment with reference to FIG. 3, the determination of the mixer configuration at block 502 and the enabling of the buffer at block 504 may be performed by the controller 344, the processing of the RF signals at block 506 may be performed by the LNA 320 and downconverters 330A, 330B, 330C under control of the controller 344, the determination of the second mixer configuration at block 508 and the disabling of the buffer at block 510 may be performed by the controller 344, and the processing of the RF signals at block 512 may be performed by the LNA 320 and down-converters 330A, 330B, 330C under control of the controller 344. In some embodiments, the controller 344 may be a processor within a mobile device, and in other embodiments the controller 344 may be a fixed-function or generic processor separate from an application processor within a mobile device.

Figure 6:
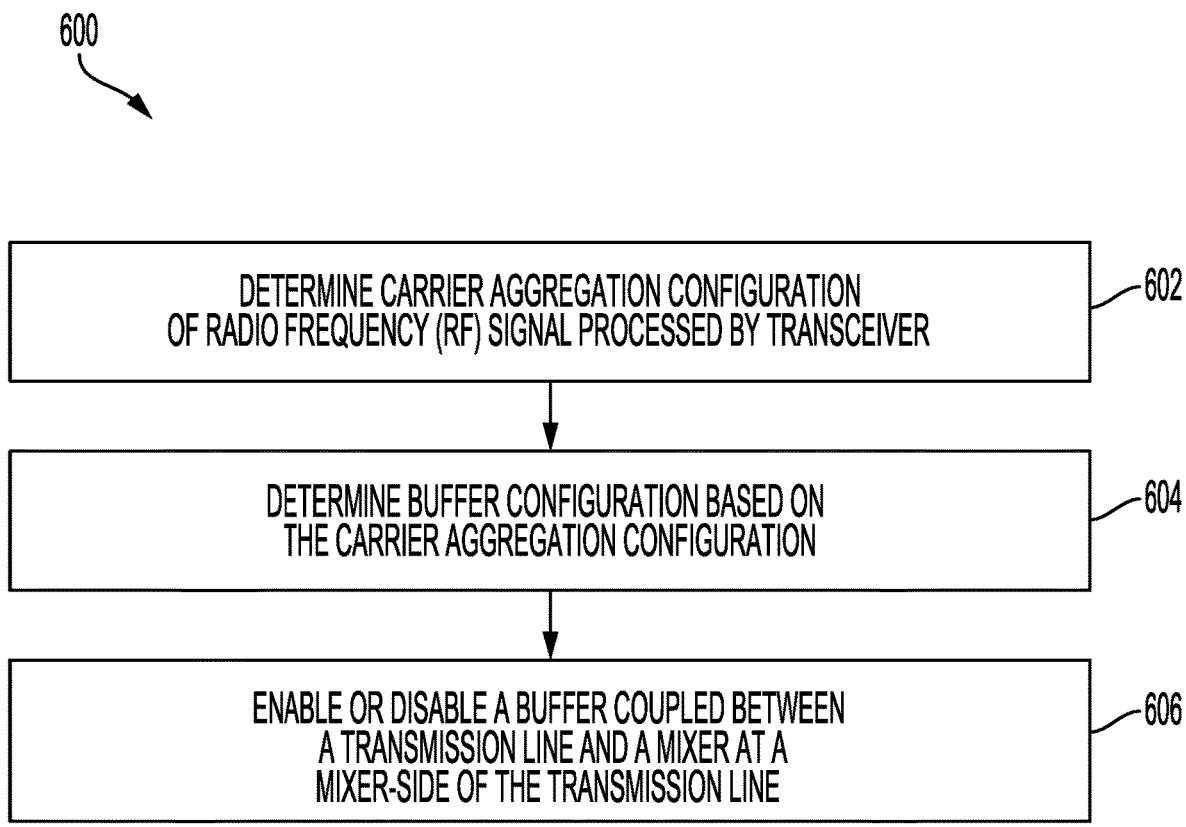
FIG. 6 is a flow chart illustrating a method for determining a transceiver configuration in a transceiver supporting multiple wireless access technologies according to one or more aspects.

In some embodiments, the mixer configuration determined at blocks 502 and 508 may be based on the carrier aggregation (CA) configuration for RF transceiver active at the time of the determination. One example determination of a mixer configuration based on CA configuration is shown in FIG. 6. FIG. 6 is a flow chart illustrating a method for determining a transceiver configuration in a transceiver supporting multiple wireless access technologies according to one or more aspects. A method 600 includes, at block 602, determining a carrier aggregation configuration of a radio frequency (RF) signal processed by a RF transceiver. For example, the CA configuration may include a listing of frequency bands on which data is transmitted in parallel for assembly at a receiver. The CA configuration may include a combination of radio access technologies (RATs), such as a combination of sub-7 GHz and mmWave bands. At block 604, the buffer configuration may be determined based on the CA configuration determined a block 602. The buffer configuration may specify, for example, which isolating buffers should be enabled or disabled. At block 606, the isolating buffers coupled to certain transmission lines may be enabled or disabled based on the carrier configuration. For example, a controller may generate an N-length array of Boolean values, in which N corresponds to a number of transmission lines with isolating buffers. The controller may generate enable control signals from this N-length array to enable or disable various isolating buffers.

Figure 4B:
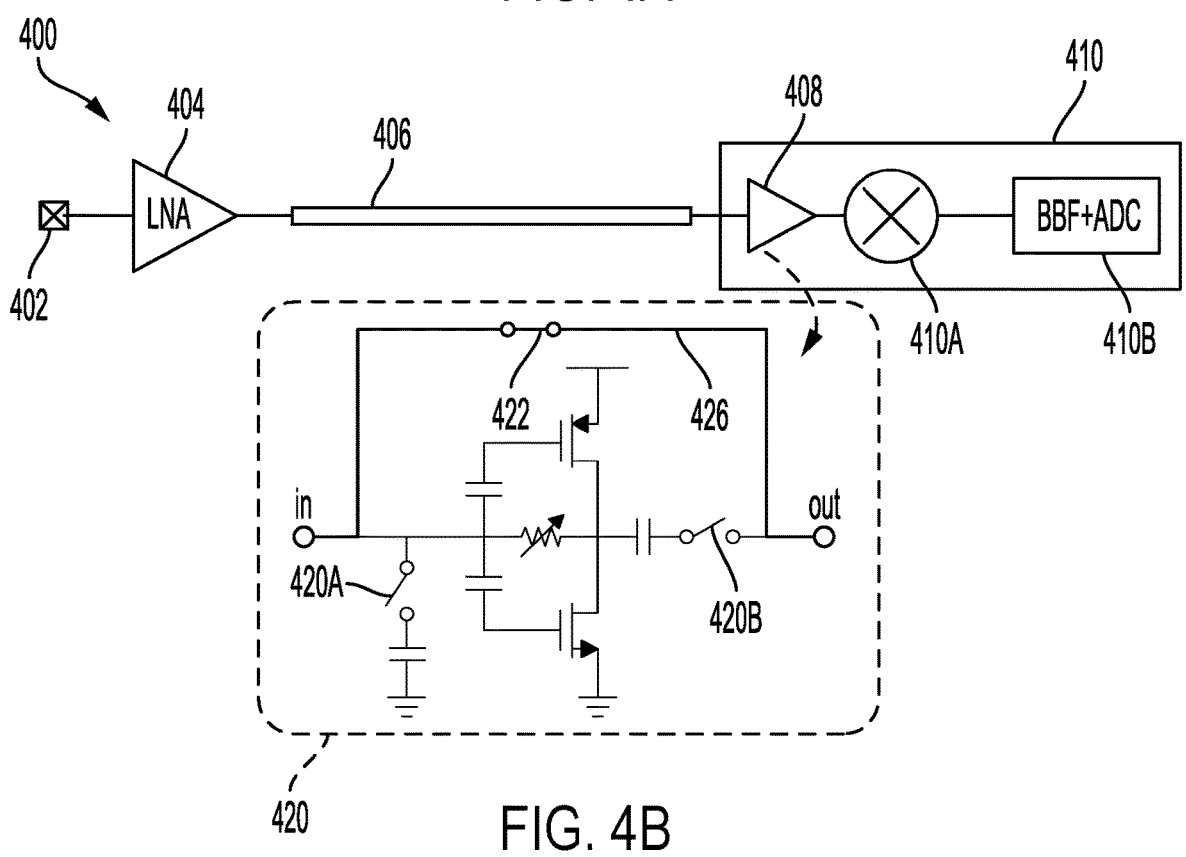
FIG. 4B is a circuit schematic illustrating a configurable buffer with the buffer disabled for isolating a mixer in a downconversion circuit according to one or more aspects.
Figure 7A:
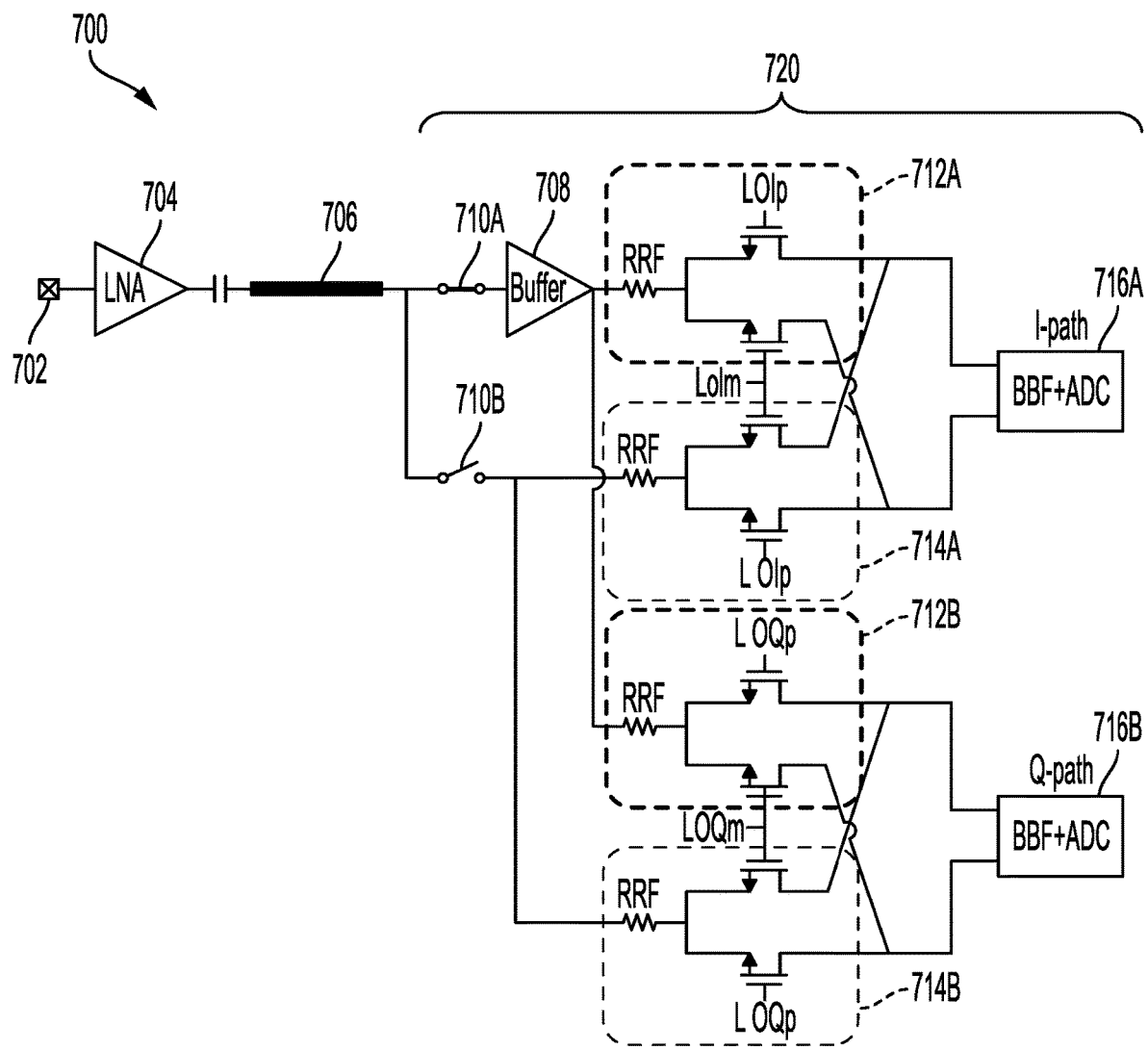
FIG. 7A is a circuit schematic illustrating a configurable buffer with the buffer enabled for isolating a single-balanced mixer in a downconversion circuit according to one or more aspects.
Figure 7B:
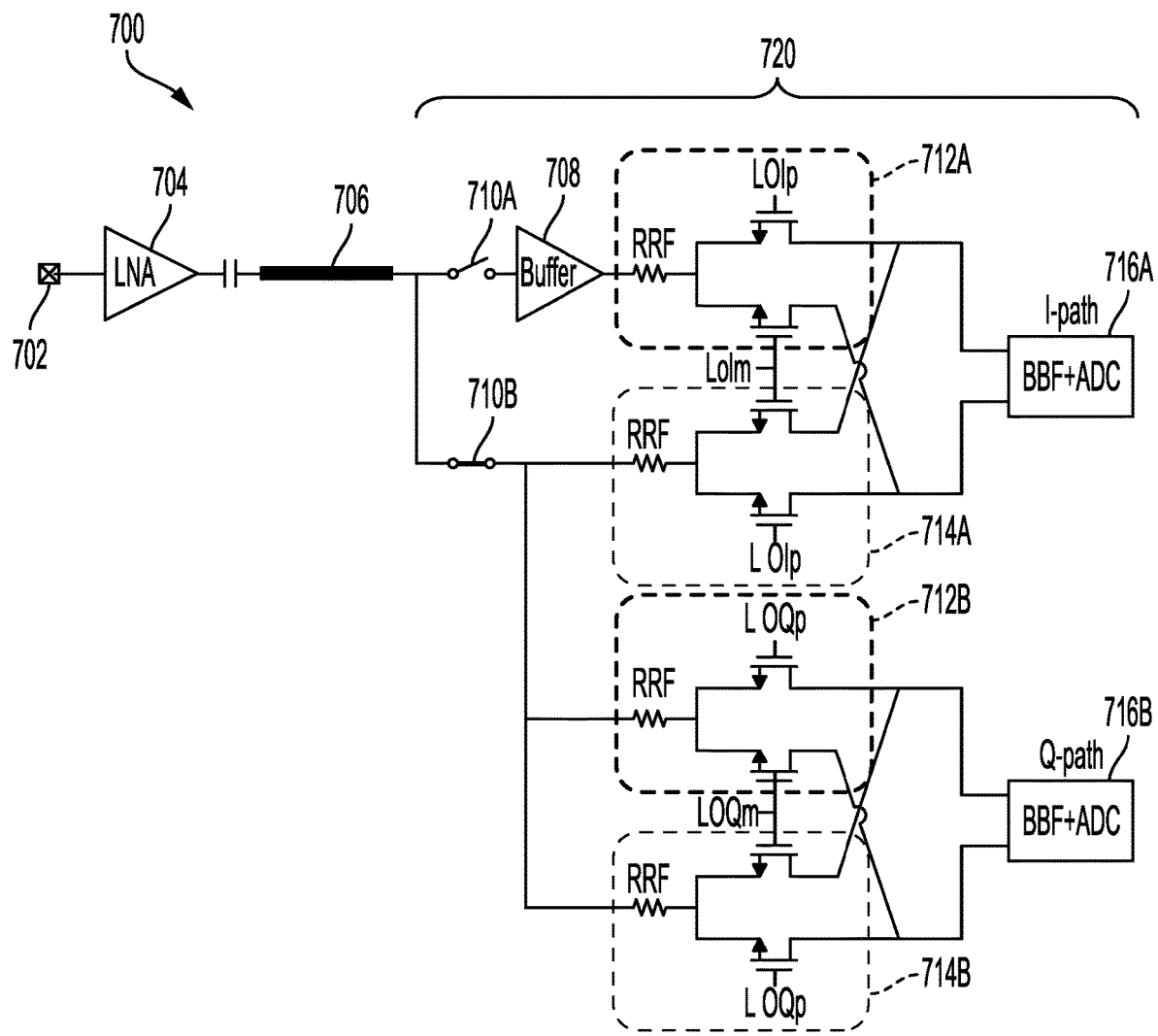
FIG. 7B is a circuit schematic illustrating a configurable buffer with the buffer disabled for isolating a single-balanced mixer in a downconversion circuit according to one or more aspects.

The isolating buffers shown in FIG. 3, FIG. 4A, and FIG. 4B, may be implemented, in some embodiments, as separate single-balanced mixers for I and Q channels. One example of such an embodiment is shown in FIG. 7A and FIG. 7B, in which FIG. 7A shows a configuration with such an isolating buffer enabled and FIG. 7B with such an isolating buffer disabled. FIG. 7A is a circuit schematic illustrating a configurable buffer with the buffer enabled for isolating a balanced mixer in a downconversion circuit according to one or more aspects. A transmission path 700 begins at input port 702 for receiving an RF signal, which is amplified at amplifier 704 and coupled through transmission line 706 to mixer-side circuitry 720. Mixer-side circuitry 720 may include a buffer 708 coupled between the transmission line 706 and mixers 712A and 712B. The buffer 708 may be configured to isolate a signal received over transmission line 706 from signals on other transmission lines in an RF transceiver. For example, the buffer 708 may be an isolating buffer, such as a CMOS amplifier, a common-source amplifier, a common-gate amplifier, and/or a source-follower amplifier. Switch 710A may be coupled between the buffer 708 and the transmission path 706 and used to control enabling or disabling of the buffer 708 by inserting or removing the buffer 708 from the transmission path 700. A controller may toggle the switch 710A to insert or remove (e.g., enable or disable) the buffer 708. In some embodiments, an enable signal may also or alternatively be used to control power to the buffer 708.

A switch 710B may be used to configure the transmission path 700 to operate without buffer 708 (such as by disabling the buffer 708). Closing switch 710B with switch 710A open couples the transmission line 706 to mixers 714A and 714B. Mixers 712A and 714A may be configured for I-path processing of the RF signals for generation of a baseband signal for input to down-converter circuitry 716A. Mixers 712B and 714B may be configured for Q-path processing of the RF signals for generation of a baseband signal for input to down-converter circuitry 716B. Although separate I and Q paths are shown in FIG. 7A, different RF signal processing techniques may be applied to the RF signal received through transmission line 706 and isolating buffer 708.

The transmission path 700 of FIG. 7A shows a configuration with switch 710A closed and switch 710B open for coupling the RF signal from the transmission line 706 through the isolating buffer 708. In this configuration, the mixers 714A and 714B may operate as dummy mixers by coupling with the mixers 712A and 712B, respectively, which operate as main mixers. The transmission path 700 may be reconfigured to bypass isolating buffer 708 as shown in FIG. 7B. FIG. 7B is a circuit schematic illustrating a configurable buffer with the buffer disabled for isolating a balanced mixer in a downconversion circuit according to one or more aspects. The transmission path 700 of FIG. 7B shows a configuration with switch 710A open and switch 710B closed for coupling the RF signal from the transmission line 706 around the isolating buffer 708. In this configuration, the mixers 712A and 712B may operate as dummy mixers by coupling with the mixers 714A and 714B, respectively, which operate as main mixers.

Multiple transmission paths according to one or several of the embodiments described above may be incorporated in an RF transceiver for coupling amplifiers to mixers across transmission lines. In some embodiments, amplifiers may couple to multiple mixers through a switching matrix to provide flexibility in the processing of RF signals. In some embodiments, downconversion circuitry may be shared by the mixers to reduce the amount of circuitry, and thus reduce chip size and reduce power consumption for wireless circuitry in an integrated circuit (IC). Isolating buffers may be included in some transmission paths to reduce desensing of one frequency band on one transmission path due to the presence of another frequency band on another transmission path. One example of a RF transceiver with a switching matrix and isolating buffers is shown in FIG. 8.

Figure 8:
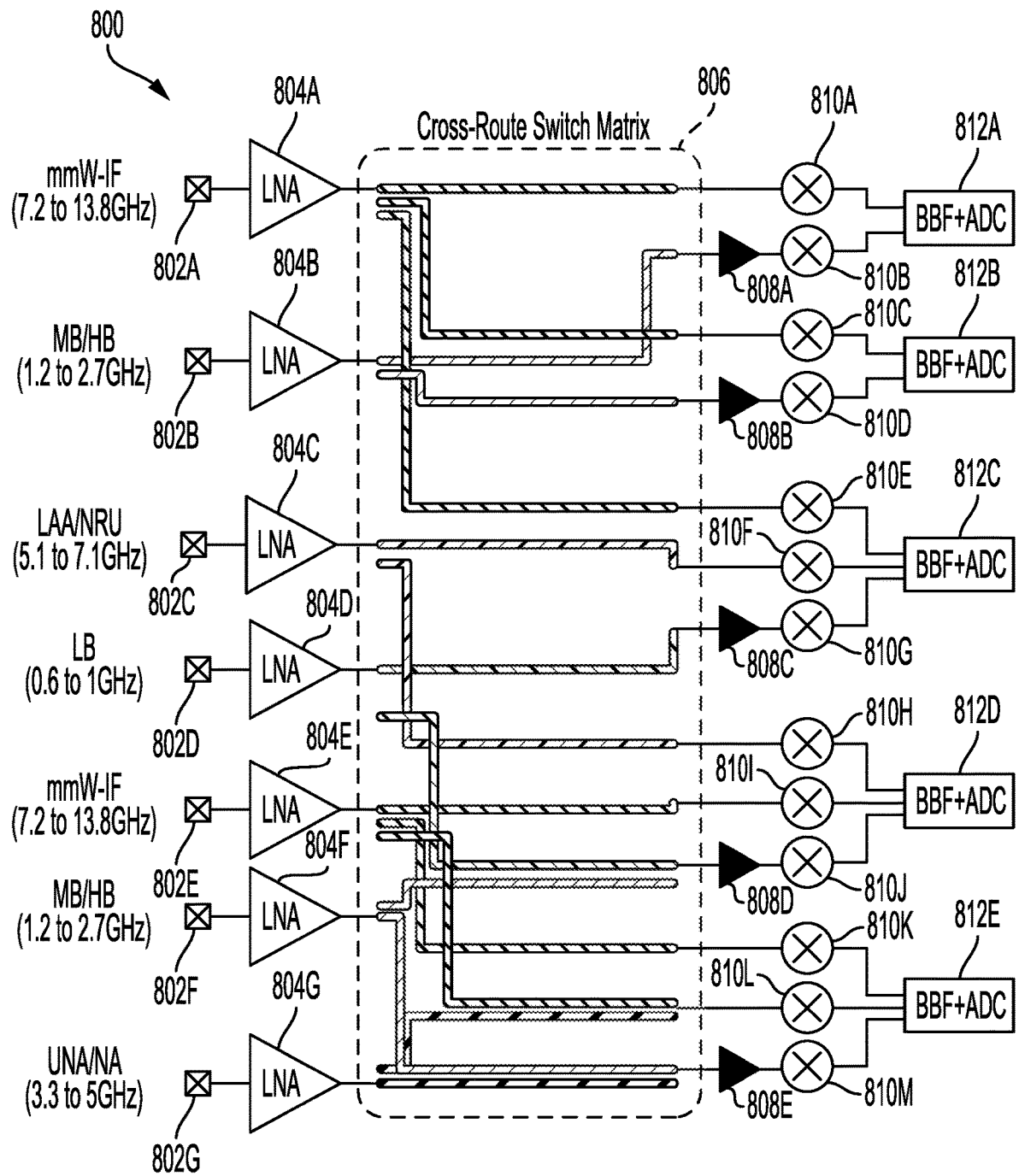
FIG. 8 is a block diagram illustrating a receiver with isolating buffers for supporting multiple wireless access technologies according to one or more aspects.

FIG. 8 is a block diagram illustrating a receiver with isolating buffers for supporting multiple wireless access technologies according to one or more aspects. A RF receiver 800 may include input ports 802A-G for receiving RF signals, such as may be received through RF front-end (RFFE) circuitry coupled to the RF transceiver. The input ports 802A-G may each receive input signals in specific frequency bands. For example, input port 802A may receive mmWave-IF signals (e.g., 7.2-13.8 GHz), input port 802B may receive MB/HB signals (e.g., 1.2-2.7 GHz), input port 802C may receive LAA/NRU signals (e.g., 5.1-7.1 GHz), input port 802D may receive LB signals (e.g., 0.6-1 GHz), input port 802E may receive mmWave-IF signals (e.g., 7.2-13.8 GHz), input port 802F may receive MB/HB signals (e.g., 1.2-2.7 GHz), and input port 802G may receive UNA/NA signals (e.g., 3.3-5 GHz). The RF signals at input ports 802A-G may be amplified with corresponding LNAs 804A-G. Although a one-to-one correlation between LNAs and input ports is shown, some input ports may be coupled to multiple amplifiers and/or some amplifier may be coupled to multiple input ports.

A switch matrix 806 may couple the LNAs 804A-G to mixer-side circuit, such as for down-converting RF signals received at the input ports 802A-G. The switch matrix 806 may include transmission lines and/or may be coupled at the LNA-side or the mixer-side of a transmission line coupling the LNAs 804A-G to mixer-side circuitry. The transmission lines through the switch matrix 806 may cross paths, such as by being cross-routed over or under another transmission line, which may increase interference coupling from one transmission line to another transmission line because of the cross-routing. The switch matrix 806 may couple some LNAs to multiple down-converting mixers and/or some down-converting mixers to individual LNAs. For example, the switch matrix 806 may couple the LNA 804A, and its amplified mmWave-IF signal output, to mixer 810A, mixer 810C, and mixer 810E. As another example, the switch matrix 806 may couple the LNA 804B, and its amplified MB/HB signal output, to mixer 810B and mixer 810D. The mixers 810A-M may be configured to down-convert the RF signals input to the switch matrix 806 to a baseband frequency.

The baseband signals output by the mixers 810A-M may share baseband processing circuitry 812A-E, which may include a baseband filter (BBF) and/or an analog-to-digital converter (ADC). The mixer-side circuitry may be organized into discrete down-converters, such as a first down-converter comprising the buffer 808A, mixers 810A-B, and baseband circuitry 812A, a second down-converter comprising the buffer 808B, mixers 810C-D, and baseband circuitry 812B, a third down-converter comprising the buffer 808C, mixers 810E-G, and baseband circuitry 812C, a fourth down-converter comprising the buffer 808D, mixers 810H-J, and baseband circuitry 812D, and a fifth down-converter comprising the buffer 808E, mixers 810K-M, and baseband circuitry 812E.

Some down-converting mixers may be coupled to the switch matrix 806 through one of isolating buffers 808A-E. For example, an isolating buffer 808A may couple the mixer 810B to the LNA 804B, an isolating buffer 808B may couple the mixer 810D to LNA 804B, the isolating buffer 808C may couple the mixer 810G to LNA 804D, the isolating buffer 808D may couple the mixer 810J to LNA 804D, and the isolating buffer 808E may couple the mixer 810M to LNA 804G. The isolating buffers 808A-E may be coupled to transmission lines with higher interference based on the frequency bands input to the LNAs 804A-G. For example, the isolating buffer 808A is coupled to a transmission path for a MB/HB signal that is nearby to a transmission path for a mmWave-IF signal. The isolating buffer 808A improves isolation of the MB/HB signal and spurs on the transmission path for the MB/HB signal from coupling to the transmission path for the mmWave-IF signal. The isolating buffers 808A-E may be enabled or disabled based on a band configuration, such as a carrier aggregation (CA) configuration, in operation. For example, if no MB/HB signal is included in a grant for a UE then the isolating buffer 808A may be disabled.

The isolating buffers 804A-G may each have the same configuration or may have different configurations for implementing bypassing the buffers, and some RF signal processing paths may omit an isolating buffer. In some embodiments, one or more of the isolating buffers 804A-G implement circuitry described herein, such as the circuit 420 illustrated in FIG. 4A and FIG. 4B, in which a bypass path is provided through one or more switches to direct an RF signal around the transistors and/or other components configured for buffering the RF signal. In some embodiments, one or more of the isolating buffers 804A-G may include an enable switch as a manner of powering down the transistors and/or other components configured for buffering the RF signal but allowing the RF signal to pass through the components. In some embodiments, the RF transceiver 800 may include a mix of configurations for isolating buffers 804A-G such that some buffers include enable switches, some buffers include bypass paths, and some buffers include enable switches and bypass paths.

Figure 9:
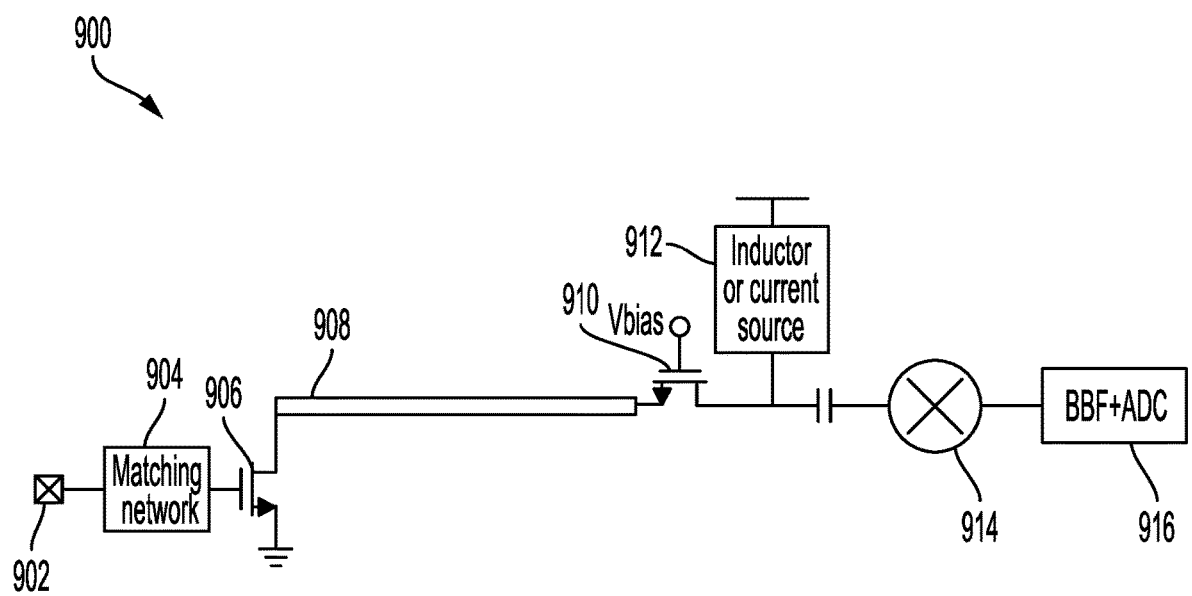
FIG. 9 is a circuit schematic illustrating a use of a cascode device as an isolating buffer in a transceiver according to one or more aspects.

Several embodiments of isolating buffers are described above. Another embodiment of an isolating buffer uses cascode devices coupled to the transmission line and is shown in FIG. 9. FIG. 9 is a circuit schematic illustrating a use of a cascode device as an isolating buffer in a transceiver according to one or more aspects. A transmission path 900 includes an input port 902 for receiving a radio frequency (RF) signal for processing. The input port 902 may be coupled to a matching network 904 and to an amplifier 906 (e.g., an input transconductance device). A transmission line 908 couples the amplifier 906 to an isolating buffer 910, which may be a cascode device such as a cascode transistor with inductor or current source 912, and to a down-converting mixer 914. The baseband signal output by down-converting mixer 914 may be coupled to baseband circuitry 916, such as a baseband filter (BBF) and/or analog-to-digital converter (ADC).

The isolating mixer of various embodiments of the disclosure may improve isolation between transmission lines to reduce one or more coupling mechanisms operating that couple spurs on one transmission line to another transmission line. One example implementation of the isolating mixer for isolating a Band 7 (B7) signal at 2.7 GHz results in an isolation improvement of approximately 24-28 decibels. Two mechanisms for interference that may be reduced by the isolating mixer are (1) LO harmonics leaked to the transmission line from the local oscillator; and (2) transmit (Tx) leakage onto a receive path mixed down with LO and then mixed up with LO harmonics. Those interference appeared on the transmission line would couple to the other transmission lines. This invention significantly reduces the coupling between transmission lines. The isolation improvement of spurs due to various coupling mechanisms is shown for one example implementation in Table 1.

| Signal | Spur Mechanism | Spur Frequency (GHz) | Without isolating mixer | With isolating mixer | Isolation improvement (dB) |
|---|---|---|---|---|---|
| 3LO_leak_TL_out | 3*LO | 8.1 | −84.6 | −109 | 24 |
| 3LO_leak_Mixer_in | 3*LO | 8.1 | −84.6 | −86.9 | |
| 4LO_leak_TL_out | 4*LO | 10.8 | −44.7 | −70.2 | 26 |
| 4LO_leak_Mixer_in | 4*LO | 10.8 | −44.7 | −48.1 | |
| 5LO_leak_TL_out | 5*LO | 13.5 | −89.8 | −117.3 | 27 |
| 5LO_leak_Mixer_in | 5*LO | 13.5 | −89.8 | −94.4 | |
| 4LOmTX_TL_out | 4*LO − Tx = 3*LO + Fdplx | 8.22 | −39.5 | −64.1 | 25 |
| 4LOmTX_Mixer_in | 4*LO − Tx = 3*LO + Fdplx | 8.22 | −39.5 | −41.7 | |
| 4LOpTX_TL_out | 4*LO + Tx = 5*LO − Fdplx | 13.38 | −43.3 | −71.7 | 28 |
| 4LOpTX_Mixer_in | 4*LO + Tx = 5*LO − Fdplx | 13.38 | −43.3 | −46.8 | |

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIG. 1, FIG. 2, and FIG. 3 include some or all of processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

In one or more aspects, techniques for supporting wireless communication by processing radio frequency (RF) signals may include additional aspects, such as any single aspect or any combination of aspects described below or in connection with one or more other processes or devices described elsewhere herein. In one or more aspects, supporting wireless operations may include an apparatus having a plurality of amplifiers configured to amplify a respective plurality of input signals, such as by being coupled to one or more input nodes for receiving the plurality of input signals, wherein the respective plurality of input signals correspond to input signals in different frequency bands; a plurality of down-converters each configured to process an output of at least one of the plurality of amplifiers, such as by being coupled to the plurality of amplifiers; a plurality of transmission lines coupling the plurality of amplifiers to the plurality of down-converters, wherein each down-converter of the plurality of down-converters comprises a first mixer and a buffer coupled between the first mixer and one of the plurality of transmission lines. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus, such as described in FIG. 5A, FIG. 5B, and/or FIG. 6. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a first aspect, the buffer of one or more of the down-converters is configured to be enabled or disabled.

In a second aspect, alone or in combination with the first aspect, the buffer comprises a bypass path around active components of the buffer, and wherein the bypass path is configured to de-activate (e.g., open) when the buffer is enabled, and wherein the bypass path is configured to activate (e.g., close) when the buffer is disabled.

In a third aspect, alone or in combination with one or more of the first aspect or the second aspect, the apparatus further includes a controller coupled to the plurality of down-converters and configured to control enabling and disabling of the buffer of each of the plurality of down-converters.

In a fourth aspect, alone or in combination with one or more of the first aspect through the third aspect, the controller is configured to apply a buffer configuration to the plurality of down-converters, the buffer configuration specifying for each of the down-converters whether to enable or disable the buffer of the down-converter.

In a fifth aspect, alone or in combination with one or more of the first aspect through the fourth aspect, the controller is configured to determine the buffer configuration based on determining an active carrier aggregation (CA) configuration of the RF transceiver.

In a sixth aspect, alone or in combination with one or more of the first aspect through the fifth aspect, the controller is configured to determine the buffer configuration based on determining an active carrier aggregation (CA) configuration includes a mmWave band.

In a seventh aspect, alone or in combination with one or more of the first aspect through the sixth aspect, the plurality of down-converters each comprise a second mixer coupled to the one of the plurality of transmission lines and coupled to the first mixer; a third mixer coupled to the buffer; and/or a fourth mixer coupled to the one of the plurality of transmission lines and to the third mixer.

In an eighth aspect, alone or in combination with one or more of the first aspect through the seventh aspect, the controller is configured to configure the second mixer and the fourth mixer of one of the plurality of down-converters as dummy mixers when the buffer of the one of the plurality of down-converters is enabled for the first mixer and the third mixer; and/or the controller is configured to configure the first mixer and the third mixer of one of the plurality of down-converters as dummy mixers when the corresponding buffer of the one of the plurality of down-converters is disabled.

In a ninth aspect, alone or in combination with one or more of the first aspect through the eighth aspect, the controller is configured to determine a spur value on one of the plurality of transmission lines; and/or enable the buffer of one of the plurality of down-converters coupled to the one of the plurality of transmission lines in response to the spur value of the one of the plurality of transmission lines being above a threshold value.

In a tenth aspect, alone or in combination with one or more of the first aspect through the ninth aspect, the buffer comprises a shunt capacitor configured to couple the one of the plurality of transmission lines to a negative power supply in response to the controller enabling the buffer.

In an eleventh aspect, alone or in combination with one or more of the first through tenth aspect, the plurality of amplifiers comprises a first amplifier configured to amplify an input signal comprising a mmWave signal and a second amplifier configured to amplify at least one of a high-band (HB) signal or a mid-band (MB) signal; and the plurality of down-converters comprises a first down-converter having a first buffer and being coupled to the first amplifier and coupled to the second amplifier; and a second down-converter having a second buffer and being coupled to the first amplifier and coupled to the second amplifier.

In a twelfth aspect, alone or in combination with one or more of the first through eleventh aspect, the first buffer of the first down-converter is coupled to the transmission line of the plurality of transmission lines corresponding to the at least one of a high-band (HB) signal or mid-band (MB) signal, the first down-converter further comprises a second mixer coupled to a transmission line of the plurality of transmission lines corresponding to the mmWave signal, the second buffer of the second down-converter is coupled to the transmission line of the plurality of transmission lines corresponding to the at least one of a high-band (HB) signal or mid-band (MB) signal, and the second down-converter further comprises a second mixer coupled to a transmission line of the plurality of transmission lines corresponding to the mmWave signal.

In a thirteenth aspect, alone or in combination with one or more of the first through twelfth aspect, the plurality of amplifiers comprises a first amplifier configured to amplify an input signal comprising a LAA/NRU signal and a second amplifier configured to amplify a low-band (LB) signal; and the plurality of down-converters comprises a first down-converter having a buffer and being coupled to the first amplifier and coupled to the second amplifier, wherein the buffer (808C) of the first down-converter is coupled to a transmission line of the plurality of transmission lines corresponding to the low-band (LB) signal, and the first down-converter further comprises a second mixer coupled to a transmission line of the plurality of transmission lines corresponding to the LAA/NRU signal.

In a fourteenth aspect, alone or in combination with one or more of the first through thirteenth aspect, the plurality of amplifiers comprises a first amplifier configured to amplify an input signal comprising a UNA/NA signal and a second amplifier configured to amplify a mmWave signal; and the plurality of down-converters comprises a first down-converter having a buffer and being coupled to the first amplifier and coupled to the second amplifier, wherein the buffer of the first down-converter is coupled to a transmission line of the plurality of transmission lines corresponding to the UNA/NA signal, and the first down-converter further comprises a second mixer coupled to a transmission line of the plurality of transmission lines corresponding to the mmWave signal.

In a fifteenth aspect, alone or in combination with one or more of the first through fourteenth aspect, the buffer comprises a cascode transistor.

In a sixteenth aspect, alone or in combination with one or more of the first through fifteenth aspect, the buffer comprises a complimentary metal-oxide-semiconductor (CMOS) amplifier.

In a seventeenth aspect, alone or in combination with one or more of the first through sixteenth aspect, the buffer comprises at least one of a common-source amplifier, a common-gate amplifier, or a source-follower amplifier.

In one or more aspects, techniques for supporting wireless communications and/or radio frequency (RF) signal processing may include additional aspects, such as any single aspect or any combination of aspects described below or in connection with one or more other processes or devices described elsewhere herein. In one or more aspects, supporting wireless operations may include a method comprising determining to enable an isolating buffer of a first down-converting mixer of a radio frequency (RF) transceiver; enabling the isolating buffer of the first down-converting mixer of the RF transceiver in response to the determining to enable the isolating buffer; and/or down-converting a first input signal received from a first transmission line with the first down-converting mixer through the isolating buffer after enabling the isolating buffer. Additionally, the method may include one or more aspects as described below. In some implementations, the method may be performed by a wireless device, such as a base station or a user equipment. In some implementations, the method may be performed by at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In an eighteenth aspect, the method includes down-converting a second input signal received from a second transmission line with a second down-converting mixer coupled to the second input signal without an isolating buffer.

In a nineteenth aspect, alone or in combination with the eighteenth aspect, the determining to enable the isolating buffer is based on an active carrier aggregation (CA) configuration of the RF transceiver.

In a twentieth aspect, alone or in combination with the eighteenth or nineteenth aspect, the determining to enable the isolating buffer is based on the active carrier aggregation (CA) configuration being determined to include a mmWave band signal and a sub-7 GHz band signal.

In a twenty-first aspect, alone or in combination with one or more of the eighteenth through twentieth aspect, down-converting the first input signal comprises down-converting the sub-7 GHz band signal, and wherein down-converting the second input signal comprises down-converting the mmWave band signal.

In a twenty-second aspect, alone or in combination with one or more of the eighteenth through twenty-first aspect, the determining to enable the isolating buffer is based on determining a spur value on the first transmission line is above a threshold value.

In a twenty-third aspect, alone or in combination with one or more of the eighteenth through twenty-second aspect, the method may further include activating a shunting capacitor of the down-converting mixer before down-converting the first input signal.

In a twenty-fourth aspect, alone or in combination with one or more of the eighteenth through twenty-third aspect, down-converting the first input signal comprises coupling the first input signal to the first down-converting mixer, and/or decoupling the first input signal from a dummy mixer coupled to the first down-converting mixer.

In one or more aspects, techniques for supporting wireless communication by processing radio frequency (RF) signals may include additional aspects, such as any single aspect or any combination of aspects described below or in connection with one or more other processes or devices described elsewhere herein. In one or more aspects, supporting wireless operations may include an apparatus having an input node; an amplifier coupled to the input node; a transmission line coupled to the amplifier; a down-converter coupled to the transmission line, wherein the down-converter comprises a first mixer and means for selectively providing isolation between the first mixer and the transmission line. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus, such as described in FIG. 5A, FIG. 5B, and/or FIG. 6. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a twenty-fifth aspect, the apparatus further includes means for determining to provide isolation through the means for selectively providing isolation based on an active carrier aggregation (CA) configuration for an input signal received at the input node.

In a twenty-sixth aspect, alone or in combination with the twenty-fifth aspect, the means for selectively providing isolation comprises means for filtering an input signal by shunting a capacitor or programmable capacitors to a negative power supply.

In a twenty-seventh aspect, alone or in combination with one or more of the twenty-fifth through twenty-sixth aspect, the first mixer comprises an I-channel mixer, and wherein the downconverter further comprises a second mixer comprising a Q-channel mixer.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if an apparatus is described as containing components A, B, or C, the apparatus may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus, comprising:
a plurality of amplifiers configured to amplify a respective plurality of input signals, wherein the respective plurality of input signals correspond to input signals in different frequency bands;
a plurality of down-converters each configured to process an output of at least one of the plurality of amplifiers; and
a plurality of transmission lines coupling the plurality of amplifiers to the plurality of down-converters,
wherein each down-converter of the plurality of down-converters comprises:
a first mixer; and
a buffer coupled between the first mixer and one of the plurality of transmission lines, wherein the buffer is configured to be enabled or disabled, wherein the buffer comprises a bypass path around active components of the buffer, and wherein the bypass path is configured to open when the buffer is enabled.

2. The apparatus of claim 1, further comprising a controller coupled to the plurality of down-converters and configured to control enabling and disabling of the buffer of each of the plurality of down-converters.

3. The apparatus of claim 2, wherein the controller is configured to apply a buffer configuration to the plurality of down-converters, the buffer configuration specifying for each of the plurality of down-converters whether to enable or disable the buffer of the down-converter.

4. The apparatus of claim 3, wherein the controller is configured to determine the buffer configuration based on determining an active carrier aggregation (CA) configuration.

5. The apparatus of claim 4, wherein the controller is configured to determine the buffer configuration based on determining an active carrier aggregation (CA) configuration includes a mmWave band.

6. The apparatus of claim 2, wherein the plurality of down-converters each comprise:
a second mixer coupled to the one of the plurality of transmission lines and coupled to the first mixer;
a third mixer coupled to the buffer; and
a fourth mixer coupled to the one of the plurality of transmission lines and to the third mixer.

7. The apparatus of claim 6, wherein:
the controller is configured to configure the second mixer and the fourth mixer of one of the plurality of down-converters as dummy mixers when a corresponding buffer of the one of the plurality of down-converters is enabled; and
the controller is configured to configure the first mixer and the third mixer of one of the plurality of down-converters as dummy mixers when the corresponding buffer of the one of the plurality of down-converters is disabled.

8. The apparatus of claim 2, wherein the controller is configured to:
determine a spur value on one of the plurality of transmission lines; and
enable the buffer of one of the plurality of down-converters coupled to the one of the plurality of transmission lines in response to the spur value of the one of the plurality of transmission lines being above a threshold value.

9. The apparatus of claim 2, wherein the buffer comprises a shunt capacitor configured to couple the one of the plurality of transmission lines to a negative power supply in response to the controller enabling the buffer.

10. The apparatus of claim 1, wherein:
the plurality of amplifiers comprises a first amplifier configured to amplify an input signal comprising a mmWave signal and a second amplifier configured to amplify at least one of a high-band (HB) signal or a mid-band (MB) signal; and
the plurality of down-converters comprises:
a first down-converter having a first buffer and being coupled to the first amplifier and coupled to the second amplifier; and
a second down-converter having a second buffer and being coupled to the first amplifier and coupled to the second amplifier.

11. The apparatus of claim 10, wherein:
the first buffer of the first down-converter is coupled to the transmission line of the plurality of transmission lines corresponding to the at least one of a high-band (HB) signal or mid-band (MB) signal,
the first down-converter further comprises a second mixer coupled to a transmission line of the plurality of transmission lines corresponding to the mmWave signal,
the second buffer of the second down-converter is coupled to the transmission line of the plurality of transmission lines corresponding to the at least one of a high-band (HB) signal or mid-band (MB) signal, and
the second down-converter further comprises a second mixer coupled to a transmission line of the plurality of transmission lines corresponding to the mmWave signal.

12. The apparatus of claim 1, wherein:
the plurality of amplifiers comprises a first amplifier configured to amplify an input signal comprising a License Assisted Access/New Radio Unlicensed (LAA/NRU) signal and a second amplifier configured to amplify a low-band (LB) signal; and the plurality of down-converters comprises:
a first down-converter having a first down-converter buffer and being coupled to the first amplifier and coupled to the second amplifier,
wherein:
the first down-converter buffer is coupled to a transmission line of the plurality of transmission lines corresponding to the low-band (LB) signal, and
the first down-converter further comprises a second mixer coupled to a transmission line of the plurality of transmission lines corresponding to the LAA/NRU signal.

13. The apparatus of claim 1, wherein:
the plurality of amplifiers comprises a first amplifier configured to amplify an input signal comprising a uplink network assistance/network assistance (UNA/NA) signal and a second amplifier configured to amplify a mmWave signal; and
the plurality of down-converters comprises:
a first down-converter having a first down-converter buffer and being coupled to the first amplifier and coupled to the second amplifier,
wherein:
the first down-converter buffer is coupled to a transmission line of the plurality of transmission lines corresponding to the UNA/NA signal, and
the first down-converter further comprises a second mixer coupled to a transmission line of the plurality of transmission lines corresponding to the mmWave signal.

14. The apparatus of claim 1, wherein the buffer comprises a cascode transistor.

15. The apparatus of claim 1, wherein the buffer comprises a complimentary metal-oxide-semiconductor (CMOS) buffer.

16. The apparatus of claim 1, wherein the buffer comprises at least one of a common-source amplifier, a common-gate amplifier, or a source-follower amplifier.

17. A method, comprising:
determining to enable an isolating buffer of a first down-converting mixer of a radio frequency (RF) transceiver, wherein the determining to enable the isolating buffer is based on an active carrier aggregation (CA) configuration of the RF transceiver;
enabling the isolating buffer of the first down-converting mixer of the RF transceiver in response to the determining to enable the isolating buffer; and
down-converting a first input signal received from a first transmission line with the first down-converting mixer through the isolating buffer after enabling the isolating buffer.

18. The method of claim 17, further comprising:
down-converting a second input signal received from a second transmission line with a second down-converting mixer coupled to the second input signal without an isolating buffer.

19. The method of claim 17, wherein the determining to enable the isolating buffer is based on the active carrier aggregation (CA) configuration being determined to include a mmWave band signal and a sub-7 GHz band signal.

20. The method of claim 18, wherein down-converting the first input signal comprises down-converting a sub-7 GHz band signal, and wherein down-converting the second input signal comprises down-converting a mmWave band signal.

21. The method of claim 17, wherein the determining to enable the isolating buffer is based on determining a spur value on the first transmission line is above a threshold value.

22. The method of claim 17, further comprising activating a shunting capacitor of the first down-converting mixer before down-converting the first input signal.

23. The method of claim 17, wherein down-converting the first input signal comprises:
coupling the first input signal to the first down-converting mixer; and
decoupling the first input signal from a dummy mixer coupled to the first down-converting mixer.

24. An apparatus, comprising:
an input node;
an amplifier coupled to the input node;
a transmission line coupled to the amplifier; and
a down-converter coupled to the transmission line,
wherein the down-converter comprises:
a first mixer; and
means for selectively providing isolation between the first mixer and the transmission line.

25. The apparatus of claim 24, further comprising means for determining to provide isolation through the means for selectively providing isolation based on an active carrier aggregation (CA) configuration for an input signal received at the input node.

26. The apparatus of claim 24, wherein the means for selectively providing isolation comprises means for filtering an input signal by shunting a capacitor or programmable capacitors to a negative power supply.

27. The apparatus of claim 24, wherein the first mixer comprises an I-channel mixer, and wherein the down-converter further comprises a second mixer comprising a Q-channel mixer.

28. An apparatus, comprising:
a plurality of amplifiers configured to amplify a respective plurality of input signals, wherein the respective plurality of input signals correspond to input signals in different frequency bands;
a plurality of down-converters each configured to process an output of at least one of the plurality of amplifiers; and
a plurality of transmission lines coupling the plurality of amplifiers to the plurality of down-converters,
wherein each down-converter of the plurality of down-converters comprises:
a first mixer; and
a buffer coupled between the first mixer and one of the plurality of transmission lines, wherein the buffer is configured to be enabled or disabled, wherein:
the plurality of amplifiers comprises a first amplifier configured to amplify an input signal comprising a mmWave-IF signal and a second amplifier configured to amplify at least one of a high-band (HB) signal or a mid-band (MB) signal; and
the plurality of down-converters comprises:
a first down-converter having a first buffer and being coupled to the first amplifier and coupled to the second amplifier; and
a second down-converter having a second buffer and being coupled to the first amplifier and coupled to the second amplifier.

* * * * *